US008531952B2

(12) United States Patent
Chan et al.

(10) Patent No.: US 8,531,952 B2
(45) Date of Patent: Sep. 10, 2013

(54) METHOD FOR MEASUREMENT OF NETWORK PATH CAPACITY WITH MINIMUM DELAY DIFFERENCE

(75) Inventors: Edmond W. W. Chan, Kowloon (HK); Xiapu Luo, Atlanta, GA (US); Rocky K. C. Chang, Kowloon (HK)

(73) Assignee: The Hong Kong Polytechnic University, Hong Kong (HK)

( * ) Notice: Subject to any disclaimer, the term of this patent is extended or adjusted under 35 U.S.C. 154(b) by 581 days.

(21) Appl. No.: 12/626,965

(22) Filed: Nov. 30, 2009

(65) Prior Publication Data

US 2011/0128864 A1    Jun. 2, 2011

(51) Int. Cl.
*G06F 11/00* (2006.01)
(52) U.S. Cl.
USPC ............................ 370/234; 370/231; 370/232
(58) Field of Classification Search
USPC ................................... 370/252, 231, 232, 234
See application file for complete search history.

(56) References Cited

U.S. PATENT DOCUMENTS

| 2004/0243335 A1* | 12/2004 | Gunawardena et al. ....... 702/116 |
| 2005/0102391 A1* | 5/2005 | Ruutu et al. ................... 709/224 |
| 2006/0209701 A1* | 9/2006 | Zhang et al. .................. 370/249 |
| 2007/0242616 A1* | 10/2007 | Chang et al. .................. 370/252 |
| 2008/0250147 A1* | 10/2008 | Knibbeler et al. ............. 709/229 |
| 2009/0031035 A1* | 1/2009 | Dharmaraju et al. .......... 709/230 |
| 2009/0190482 A1* | 7/2009 | Blair ............................. 370/250 |

* cited by examiner

*Primary Examiner* — Omer Mian
(74) *Attorney, Agent, or Firm* — Duane Morris LLP

(57) ABSTRACT

A method for achieving fast and efficient measurement of path capacity of a communication network. The method includes the following steps: (a) transmitting a number of probes from a local endpoint to a remote endpoint over a network path and each probe contains at least two outgoing packets and each probe can elicit at least two response packets from the remote endpoint; (b) determining a first minDelay by measuring RTT between the time sending the first probe packet and the time receiving the first response packet; (c) determining a second minDelay by measuring RTT between the time sending the second probe packet and the time receiving the second response packet; and (d) determining a minimum delay difference by subtracting said first minDelay from said second minDelay. The minimum delay difference divided by packet size can be used as a measurement of the network path capacity.

11 Claims, 13 Drawing Sheets

METHOD FOR MEASUREMENT OF NETWORK PATH CAPACITY WITH MINIMUM DELAY DIFFERENCE

FIELD OF THE INVENTION

The present invention relates to a method of measuring network capacity of a path in communications networks. Particularly, it relates to a method and apparatus for achieving fast and efficient capacity measurement.

BACKGROUND OF THE INVENTION

Knowing network capacity is useful for many network applications to improve their performance. Network capacity (or bottleneck bandwidth) refers to the smallest transmission rate of a set of network links, forming a network path from a source to a destination. Existing tools for capacity measurement are mostly based on active methods: they inject probe packets to the network path under measurement. Capacity measurement is a challenging task in practice, because the accuracy and speed can be adversely affected by cross traffic present on the path. The cross traffic is the network traffic other than the traffic introduced by a capacity measurement method. Moreover, it is preferred to minimize the amount of overheads, which includes the amount of traffic introduced for capacity measurement, and the storage and computation requirement at the measuring node.

Existing capacity measurement tools are based on two main approaches: variable packet size (VPS) and packet dispersion. The VPS-based methods, such as clink, pathchar, and pchar, measure the capacity for each hop of the path with different packet sizes. As a result, a large number of measurements are conducted for each hop and for the entire path, thus requiring a long time for obtaining a capacity estimate and introducing a significant amount of measurement traffic to the network path.

The packet dispersion approach, on the other hand, makes use of the dispersion of two or more probe packets to measure the capacity of an end-to-end path. In particular, the packet-pair dispersion (PPD) technique, which has been used by many tools, such as Bprobe, SProbe, Capprobe, and AsymProbe, sends a pair of back-to-back probe packets to measure the dispersion of the two packets at the bottleneck link. The network capacity is then given by the probe packet size divided by the dispersion.

The accuracy and speed of the PPD technique, however, could be seriously degraded by the cross traffic present on the path under measurement. Therefore, the basic PPD technique is usually augmented by a cross-traffic filtering technique to filter measurement samples that may have been biased by cross traffic. For example, Bprobe proposed in R. Carter and M. Crovella, "Measuring Bottleneck Link Speed in Packet-Switched Networks," Performance Evaluation, 1996 filters inaccurate estimates using union and intersection of packet-pair measurements with different packet sizes. SProbe proposed in S. Saroiu, P. Gummadi, and S. Gribble, "SProbe: A Fast Technique for Measuring Bottleneck Bandwidth in Uncooperative Environments," Proc. IEEE INFOCOM, 2002 uses two heuristics to discard samples that have abnormally small dispersion and packet reordering.

Kapoor et al., "CapProbe: A Simple and Accurate Capacity Estimation Technique," Proc. ACM SIGCOMM, 2004 proposes the use of a minimum delay sum (MDSUM) method to filter out measurements that do not meet a minimum delay sum condition. The MDSUM method is used in both CapProbe and AsymProbe to filter inaccurate measurement samples. Pasztor and Veitch, "The Packet Size Dependence of Packet-pair Like Methods," Proc. IWQoS, 2002 analyzes several types of components embedded in the dispersion and selects the capacity mode from a high-resolution histogram.

However, the existing cross-traffic filtering techniques still suffer from slow speed and inefficiencies. Applications, such as determining optimal software download rates, forming peer-to-peer networks, and establishing multicast trees, will benefit from a fast estimation of network capacity. Moreover, injecting a large amount of probe traffic unnecessarily not only prolongs the estimation process, but also affects the normal traffic and introduces additional processing burdens to both the measuring and remote nodes.

The Bprobe measurement can be very slow, because it requires several phases with different probe sizes before arriving at the capacity estimation. It introduces a large number of varied-sized probes packets to the network path and requires the measuring node to retain the distribution of the bandwidth estimates for each phase for the intersection and union filtering. The memory requirement therefore increases with the bin size and the number of phases.

The SProbe's two filtering heuristics are very limited in practical applications. It does not consider the dispersion samples that may be over-estimated or under-estimated due to the presence of cross traffic. Previous studies have shown that the dispersion could be distorted by two types of cross traffic. The first type is the traffic already existing in a forwarding node located after the bottleneck link when the first probe/response packet arrives. This cross traffic could delay the first packet to the extent that the dispersion is compressed, causing a capacity overestimation. The second type is the traffic intervening the first and second probe/response packets in a forwarding node. This cross traffic could increase the second packet's queueing delay, thus causing a capacity underestimation.

The MDSUM filtering method filters out the dispersion samples that do not meet a minimum delay sum condition. The basic idea is that if any packet in a packet pair is interfered by cross traffic, additional packet delay will be introduced; therefore, a sum of the two packets' delay (i.e., a delay sum) will also increase. The drawback of the MDSUM technique is that it considers only the packet pair whose packets are both unaffected by cross traffic. It therefore discards all other packet pairs, including those in which only a single packet has been interfered. As a result, useful information in those packet pairs is not fully utilized to speed up the measurement process.

In Pasztor and Veitch, "The Packet Size Dependence of Packet-pair Like Methods," Proc. IWQoS, 2002, the measurement accuracy depends on the maximum resolution that can be supported by the measuring node. Using smaller bins would require a higher number of probe pairs, thus resulting in increasing either the average probing rate (thus the intrusiveness to the network) or time for obtaining the capacity estimate. Moreover, as the bin width decreases, more memory space will be required for the measurement.

Besides the PPD method, the packet train dispersion (PTD) technique is another example of the packet dispersion approach. The PTD technique performs capacity measurement based on the dispersion of a burst of back-to-back probe packets. Pathrate proposed in C. Dovrolis, P. Ramanathan, and D. Moore, "Packet Dispersion Techniques and a Capacity-Estimation Methodology," IEEE/ACM Trans. Networking, vol. 12, no. 6, 2004 uses both PPD and PTD for capacity measurement. DSLprobe proposed in D. Croce et al., "Capacity Estimation of ADSL Links," Proc. ACM CoNEXT, 2008 exploits the PTD technique for capacity measurement and various methods to remove any cross-traffic interfered spacing between adjacent packets in the packet train. Besides introducing a significant amount of probe traffic, another notable problem with the PTD technique is that as the trunk length increases, it is more likely for the packet train to be affected by cross traffic.

As a result, the need remains for a reliable method for capacity measurement of an end-to-end path which obtains the capacity estimate rapidly and efficiently.

SUMMARY OF THE INVENTION

The present invention provides a new method and a new apparatus for measuring the capacity of an end-to-end network path. As a particular embodiment of the present invention, a measuring node dispatches a sequence of probes, each consisting of two back-to-back data packets to the remote node of the path. In this application, the two back-to-back data packets are referred to as the first probe packet and second probe packet of a packet pair, respectively. The round-trip time (RTT) of each probe packet is measured by eliciting a response packet from the remote node. RTT means the duration between the time when the packet is sent and the time when the response packet elicited by the packet is received. The measuring node obtains a minimum RTT for the first probe packet and a minimum RTT for the second probe packet from the sequence of probes, where the two minimum RTTs generally come from different packet pairs. The network capacity can then be computed from the two minimum RTTs and the probe and response packet sizes. The back-to-back packets in the probes may be designed so that they are suitable for measuring either the forward-path capacity or reverse-path capacity, either of which may be deemed as the round-trip capacity.

As a variation of the forgoing embodiment of the present invention, a measuring node dispatches a sequence of misordered probes, each consisting of two back-to-back packets sent in a reverse order, in which the second probe packet elicits two back-to-back response packets from the remote node. The back-to-back response data packets will be received by the measuring node along a reverse path and can be used to measure the reverse-path capacity.

As the first important aspect of the present invention, the packet dispersion generally not computed from the same packet pair as the PPD methods which always obtains the packet dispersion from the same packet pair. The MDSUM filtering method ensures that both minimum RTTs come from the same pair and discards the samples that do not meet this condition. By allowing the minimum RTTs to come from different packet pairs, the present invention can obtain an accurate capacity estimate faster than the PPD methods and the MDSUM filtering method, because it is easier to find a probe packet's minimum RTT from the measurement samples than to find a packet pair for which both probe packets' RTTs are minimum.

As the second important aspect of the present invention, the information in the probes is utilized more effectively, and less storage and computation are required for the measurement. By exploiting useful information in a single packet (which is discarded by the MDSUM method), the present invention could send less probe packets for obtaining sufficiently accurate capacity estimates. Moreover, the present invention requires a measuring node to retain only two minimum RTTs and to run a very simple minimum RTT update. In contrast, the PPD-based methods and filtering methods require more storage and computation. For example, the MDSUM filtering method is required to keep track of the minimum delay sum, the minimum delays for the first and second probe packets; and performs a validation test for each measurement. Moreover, it needs to store the packet-pair dispersion sample responsible for the minimum delay sum.

As the third important aspect of the present invention, the measurement accuracy is more resilient to the impact of cross traffic on the path. When the cross-traffic interference is high, it is easier for the present invention to obtain accurate capacity measurement than the MDSUM filtering method, because the probability of obtaining two minimum delays from different packet pairs is higher than that of obtaining two minimum delays from the same pair. When the cross traffic is low, both the present invention and the MDSUM filtering method obtain accurate capacity estimates. However, the present invention can obtain accurate capacity estimate faster than the MDSUM filtering method.

As an embodiment of the present invention, a measuring node sends two back-to-back probe Transmission Control Protocol (TCP) data packets to a public TCP server (such as, a web server) which is induced to respond to each probe TCP data packet with a response TCP data packet. The measuring node computes the dispersion by subtracting the minimum RTT for the first probe TCP packet from the minimum RTT for the second probe TCP packet. The capacity is then computed by dividing the dispersion by the TCP packet size.

As seen from the above, the present invention avoids the two major problems suffered by the existing active capacity measurement methods. The present invention speeds up the process of estimating the path capacity by computing the dispersion from different packet pairs, instead of the same packet pair performed by the PPD methods and cross-interference filtering methods. The present invention is also more efficient than the current methods, because it utilizes useful information from each packet pair (instead of discarding them) and requires minimal storage and computation from the measuring node.

The various features of novelty which characterize the invention are pointed out with particularity in the claims annexed to and forming a part of this disclosure. For a better understanding of the invention, its operating advantages and specific objects attained by its use, reference should be made to the drawings and the following description in which there are illustrated and described preferred embodiments of the invention.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF PARTICULAR EMBODIMENTS OF THE INVENTION

An Overview

Figure 1:
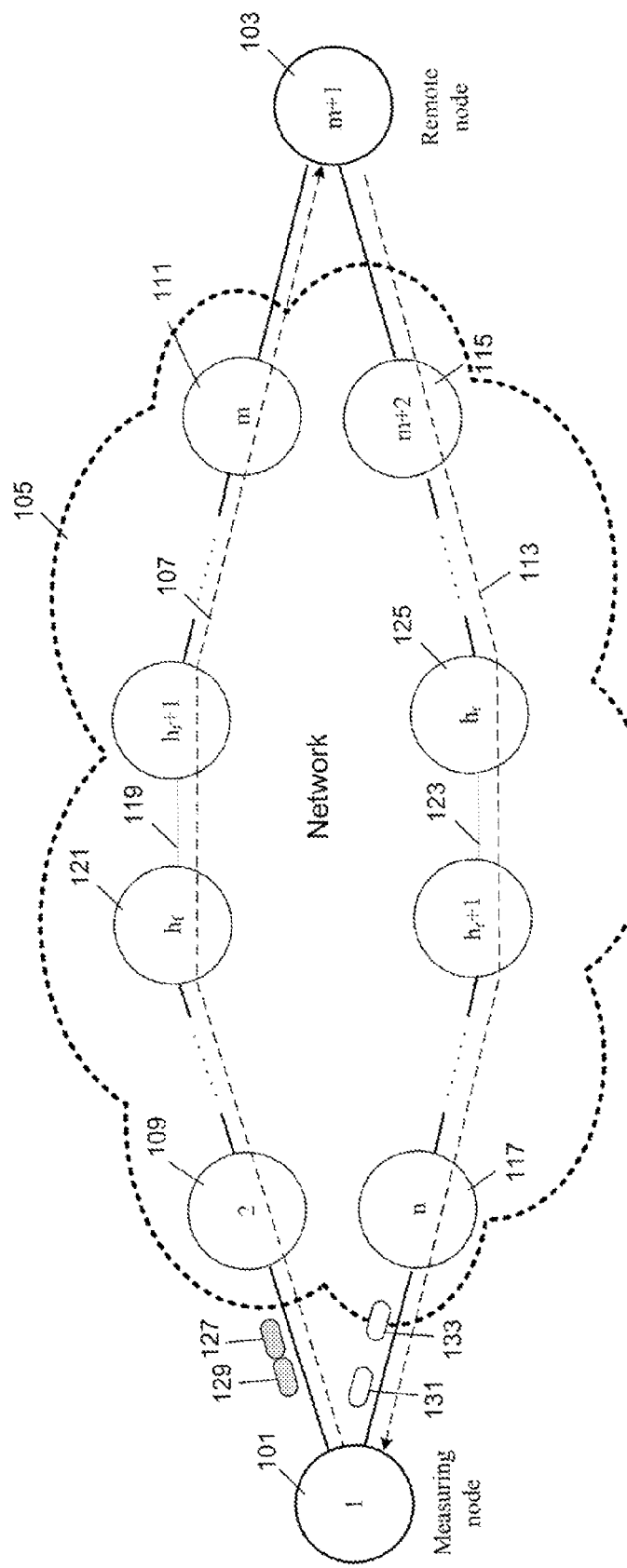
FIG. 1 is a diagram illustrating an exemplary capacity measurement scenario according to the present invention.

FIG. 1 is a block diagram illustrating a particular embodiment in accordance with the present invention. It comprises a measuring node 101 and a remote node 103. The measuring node 101 sends two back-to-back probe packets 127 and 129 to the remote node 103 through a network 105 which usually includes multiple hops (such as, routers and switches). The remote node 103, in response to receiving 127 and 129, sends two response packets 131 and 133 to 101. There are n (where n≧4) nodes on the forward path 107 and the reverse path 113, including 101 and 103. The measuring node 101 first sends the probe packets to network node 109, and network node m 111 (where 1≦m<n) subsequently forwards the probe packets 127 and 129 to the remote node 103. In response to receiving 127 and 129, the remote node sends the response packets 131 and 133 to network node m+2 115 and network node n 117 subsequently forwards the response packets 131 and 133 to the measuring node 101.

The forward path 107 and reverse path 113 together can be seen as a concatenation of n hops. Each hop consists of a (measuring, remote, or forwarding) node and its outgoing network link. The $h^{th}$ hop transmits packets to the outgoing link with a rate of $C^{(h)}$ bits/second. The network link 119 which belongs to $h_f^{th}$ hop has the smallest link capacity on the forward path 107. That is, all the hops beyond $h_f^{th}$ hop on the forward path 107, if any, have higher link capacity than 119. The network link 123 which belongs to $h_r^{th}$ hop has the smallest link capacity on the reverse path 113. That is, all the hops beyond $h_r^{th}$ hop on the reverse path, if any, have higher capacity than 123.

There are three types of path capacity metrics: forward-path capacity (denoted by $C_f^{(n)}$), reverse-path capacity (denoted by $C_r^{(n)}$), and round-trip capacity (denoted by $C_b^{(n)}$):

$$C_f^{(n)} \equiv C^{(h_f)} = \min_{1 \leq h \leq m} C^{(h)}. \quad \text{Equation 1a}$$

$$C_r^{(n)} \equiv C^{(h_r)} = \min_{m+1 \leq h \leq n} C^{(h)}. \quad \text{Equation 1b}$$

$$C_b^{(n)} = \min\{C_f^{(n)}, C_r^{(n)}\}. \quad \text{Equation 1c}$$

Figure 2:
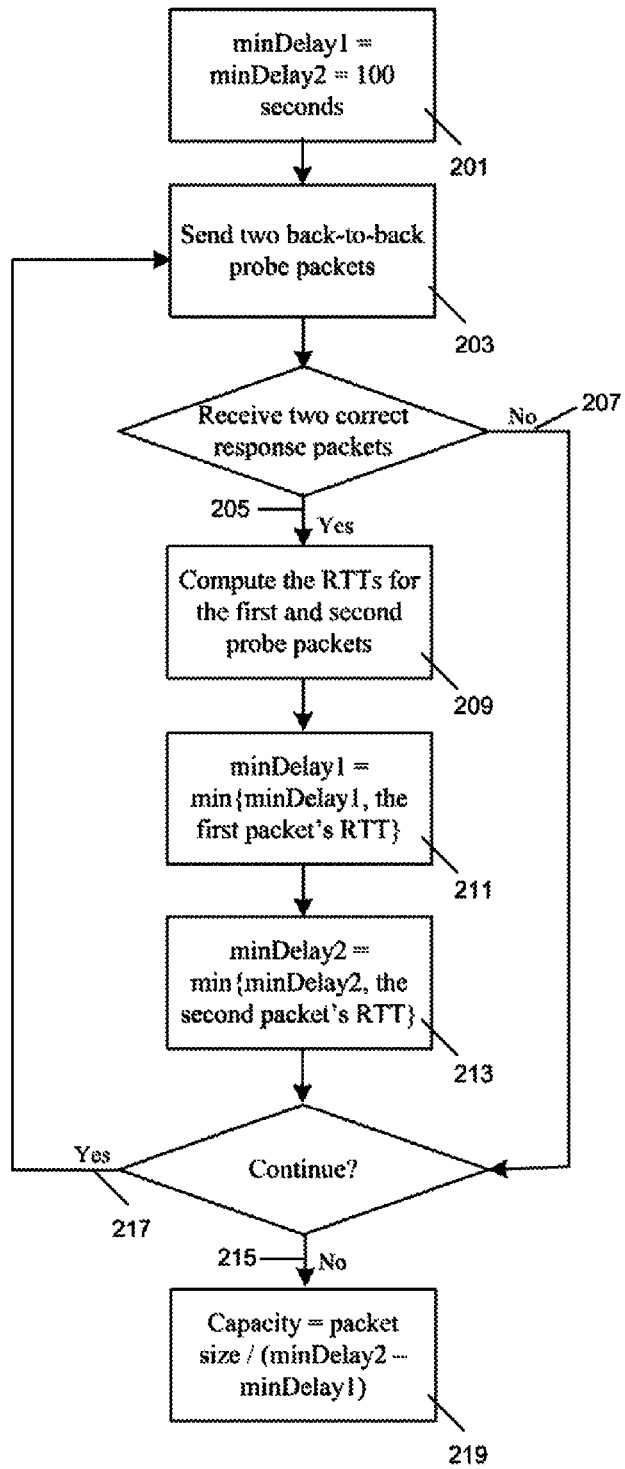
FIG. 2 is a block diagram illustrating the steps in a capacity measurement session of a particular embodiment of the present invention.

FIG. 2 is a block diagram illustrating the steps in a capacity measurement session of a particular embodiment of the present invention. In 201, the measuring node first initializes minDelay1 (the minimum RTT for the first packet in a packet pair) and minDelay2 (the minimum RTT for the second packet in a packet pair) to a reasonably large value, say 100 seconds. In 203, the measuring node dispatches two back-to-back probe packets, each of which will elicit a response packet from the remote node. If the two response packets are received correctly 205, their round-trip time (RTT) will be computed 209. The RTT of a probe packet is measured by the difference of the arrival time of a response packet and the sending time of the probe packet that elicits the response packet. If the two response packets are not received correctly 207, another packet pair may be dispatched. In 211 and 213, the minDelay1 and minDelay2 are updated, respectively. If more RTT measurement is needed 217, another packet pair is dispatched; otherwise 215, the path capacity will be computed 219.

Let $S_f$ and $S_r$ denote the probe packet size and response packet size, respectively, and the delay of transmitting a probe/response packet at $h^{th}$ hop by $X^{(h)}$: $X^{(h)} = S_f/C^{(h)}$ for $1 \leq h \leq m$ (i.e., the forward path) and $X^{(h)} = S_r/C^{(h)}$ for $h > m$ (i.e., the reverse path). The PPD method measures the round trip packet-pair dispersion (PPD), denoted by $\delta_{j-1,j}^{(n)}$. If the PPD is not affected by the cross traffic on the path, the unbiased PPD is given by $$\delta_{j-1,j}^{(n)} = \max\{X^{(h_f)}, X^{(h_r)}\}. \quad \text{Equation 2}$$

Since $X^{(h_f)} = S_f/C_f^{(n)}$ and $X^{(h_r)} = S_r/C_r^{(n)}$, the path capacity computed based on the unbiased $\delta_{j-1,j}^{(n)}$ can yield $$C_f^{(n)} = S_f/\delta_{j-1,j}^{(n)} \text{ or} \quad \text{Equation 3a}$$

$$C_r^{(n)} = S_r/\delta_{j-1,j}^{(n)} \quad \text{Equation 3b}$$

For the case of $S_f = S_r$, $$C_b^{(n)} = S_f/\delta_{j-1,j}^{(n)} = S_r/\delta_{j-1,j}^{(n)}. \quad \text{Equation 3c}$$

Unlike the PPD method, the present invention obtains the unbiased PPD by a minimum delay difference (minDelay2−minDelay1). When the RTT of a first probe packet in a packet pair and the RTT of a second probe packet in another packet pair are not affected by cross traffic, the difference gives the same unbiased PPD that would be obtained by a single packet pair in the PPD method.

The Packet-Pair Dispersion Method

Figure 3:
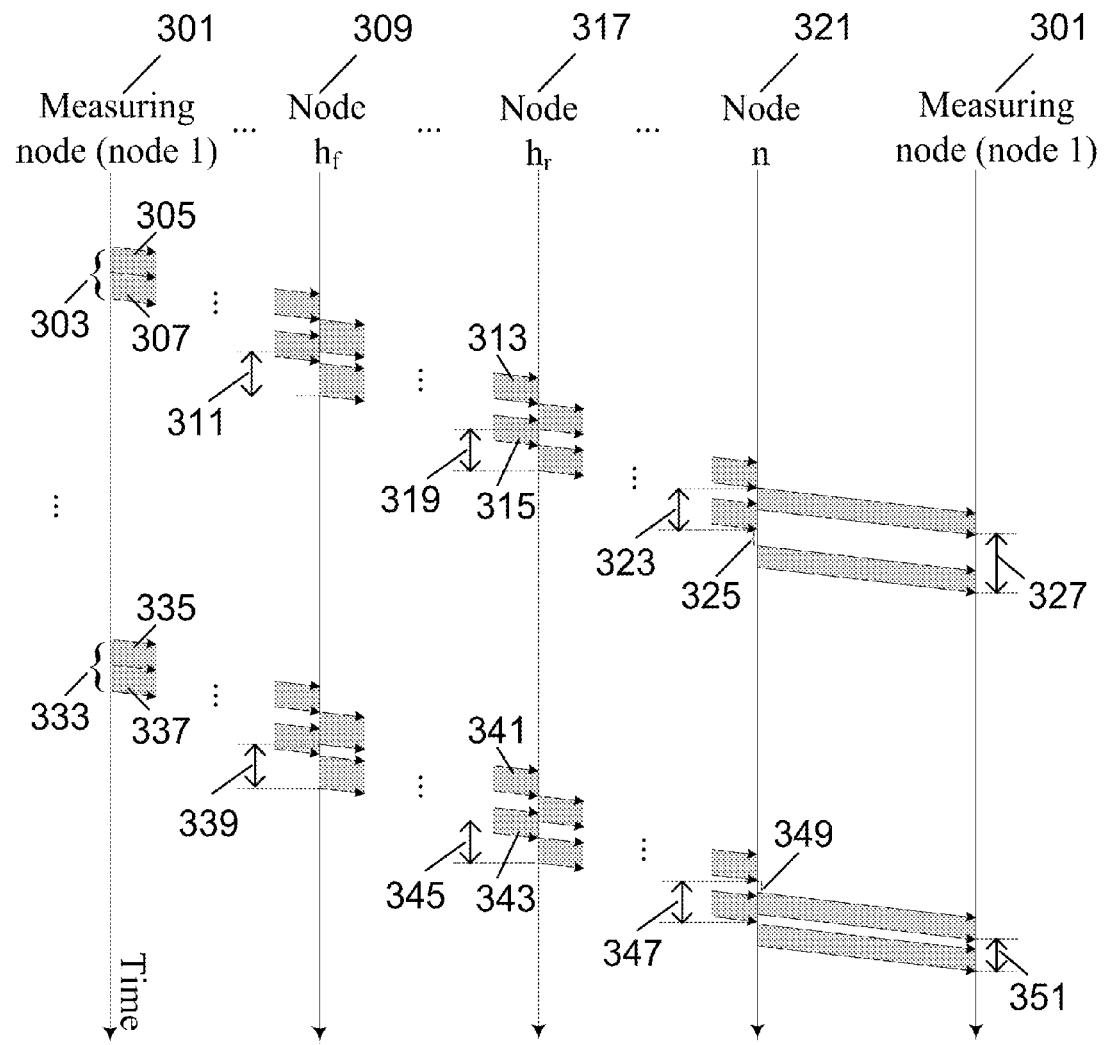
FIG. 3 is a time-line diagram illustrating an exemplary measurement session for the packet-pair dispersion method to measure forward-path dispersion and forward-path capacity.

FIG. 3 is an exemplary measurement session for the PPD method to measure forward-path dispersion and forward-path capacity. For this path, $X^{(h_f)} > X^{(h_r)}$. Therefore, according to Equation 2, a measuring node 301 measures the forward-path dispersion $X^{(h_f)}$ and the forward-path capacity according to Equation 3a by dispatching a sequence of sufficiently spaced out packet pairs.

A $k^{th}$ packet pair 303 consisting of a first probe packet $p_{2k-1}$ 305 and a second probe packet $p_{2k}$ 307 is dispatched. The two probe packets subsequently arrive at node $h_f$ 309 and leave with a dispersion of $X^{(h_f)}$ 311. The two probe packets elicit response packets $r_{2k-1}$ 313 and $r_{2k}$ 315, respectively, and they arrive at node $h_r$ 317 and leave with a dispersion of $X^{(h_f)}$ 319. The two response packets subsequently arrive at node n 321 with a dispersion of $X^{(h_f)}$ 323. The first response packet $r_{2k-1}$ is forwarded to the measuring node 301 without any queueing delay, but the second response packet $r_{2k}$ is delayed by some cross traffic 325 before being forwarded to 301. As a result, the dispersion $\delta_{2k-1,2k}^{(n)}$ 327 observed at 301 over-estimates $X^{(h_f)}$ and therefore under-estimates $C_f^{(n)}$.

An $l^{th}$ packet pair 333 consisting of a first probe packet $p_{2l-1}$ 335 and a second probe packet $p_{2l}$ 337 is dispatched later on. The two probe packets subsequently arrive at node $h_f$ 309 and leave with a dispersion of $X^{(h_f)}$ 339. The two probe packets elicit response packets $r_{2l-1}$ 341 and $r_{2l}$ 343, respectively, and they arrive at node $h_r$ 317 and leave with a dispersion of $X^{(h_f)}$ 345. The two response packets subsequently arrive at node n 321 with a dispersion of $X^{(h_f)}$ 347. The first response packet $r_{2l-1}$ is delayed by some cross traffic 349 before being forwarded to 301, but the second response packet $r_{2l}$ is forwarded to 301 without any queueing delay. As a result, the dispersion $\delta_{2l-1,2l}^{(n)}$ 351 observed at 301 under-estimates $X^{(h_f)}$ and therefore over-estimates $C_f^{(n)}$.

Figure 4:
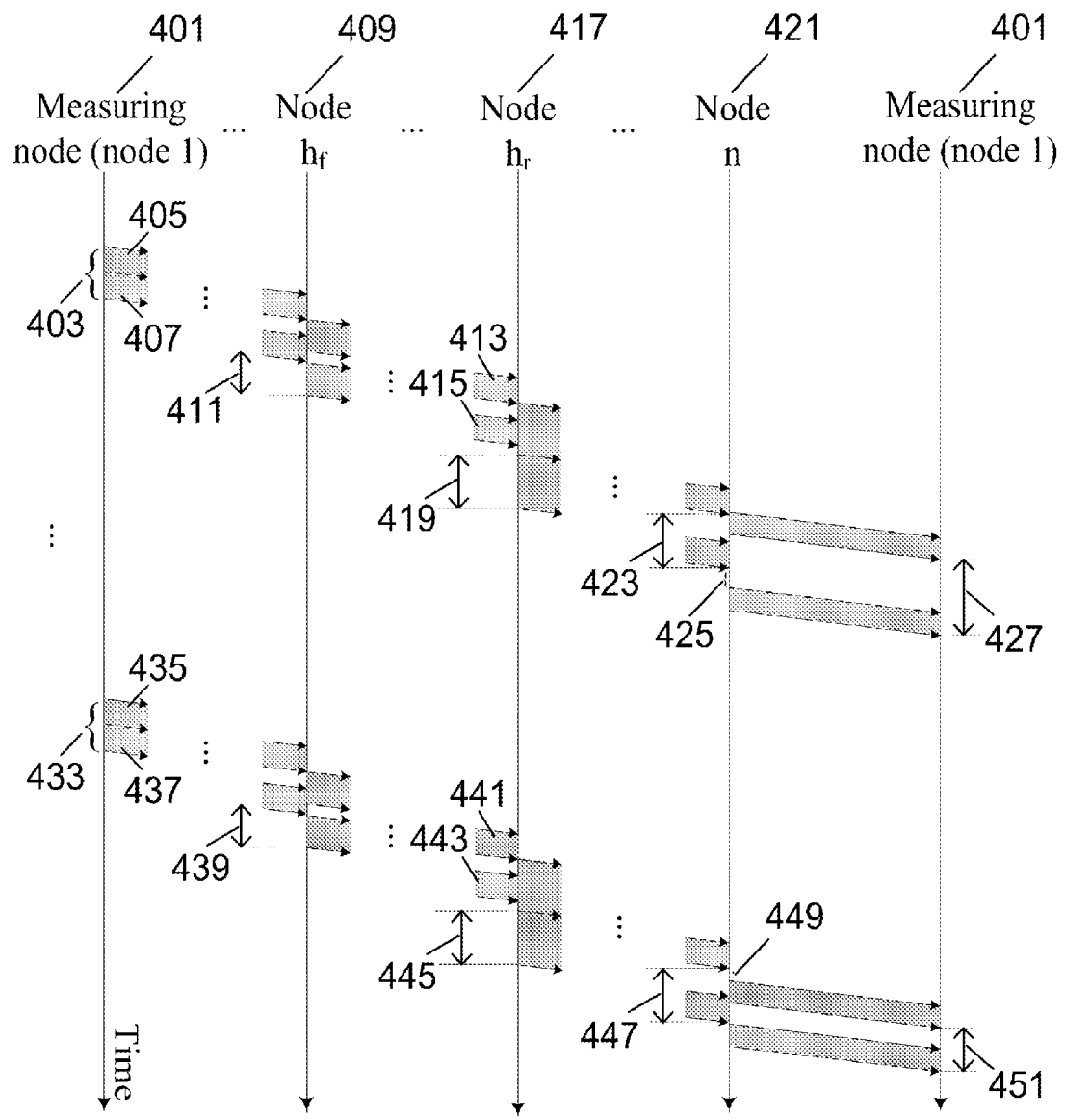
FIG. 4 is a time-line diagram illustrating an exemplary measurement session for the packet-pair dispersion method to measure reverse-path dispersion and reverse-path capacity.

FIG. 4 is an exemplary measurement session for the PPD method to measure reverse-path dispersion and reverse-path capacity. For this path, $X^{(h_f)} < X^{(h_r)}$. Therefore, according to equation 2, a measuring node 301 measures the reverse-path dispersion $X^{(h_r)}$ and the reverse-path capacity according to Equation 3b by dispatching a sequence of sufficiently spaced out packet pairs.

A $k^{th}$ packet pair 403 consisting of a first probe packet $p_{2k-1}$ 405 and a second probe packet $p_{2k}$ 407 is dispatched. The two probe packets subsequently arrive at node $h_f$ 409 and leave with a dispersion of $X^{(h_f)}$ 411. The two probe packets elicit response packets $r_{2k-1}$ 413 and $r_{2k}$ 415, respectively, and they arrive at node $h_r$ 417 and leave with a dispersion of $X^{(h_r)}$ 419. The two response packets subsequently arrive at node n 421 with a dispersion of $X^{(h_r)}$ 423. The first response packet $r_{2k-1}$ is forwarded to the measuring node 401 without any queueing delay, but the second response packet $r_{2k}$ is delayed by some cross traffic 425 before being forwarded to 401. As a result, the dispersion $\delta_{2k-1,2k}^{(n)}$ 427 observed at 401 over-estimates $X^{(h_r)}$ and therefore under-estimates $C_r^{(n)}$.

An $l^{th}$ packet pair 433 consisting of a first probe packet $p_{2l-1}$ 435 and a second probe packet $p_{2l}$ 437 is dispatched. The two probe packets subsequently arrive at node $h_f$ 409 and leave with a dispersion of $X^{(h_f)}$ 439. The two probe packets elicit response packets $r_{2l-1}$ 441 and $r_{2l}$ 443, respectively, and they arrive at node $h_r$ 417 and leave with a dispersion of $X^{(h_r)}$ 445. The two response packets subsequently arrive at node n 421 with a dispersion of $X^{(h_r)}$ 447. The first response packet $r_{2l-1}$ is delayed by some cross traffic 449 before being forwarded to 401, but the second response packet $r_{2l}$ is forwarded to 401 without any queueing delay. As a result, the dispersion $\delta_{2l-1,2l}^{(n)}$ 451 observed at 401 under-estimates $X^{(h_r)}$ and therefore over-estimates $C_r^{(n)}$.

The two cross-traffic scenarios in FIG. 3 and FIG. 4 will result in inaccurate capacity measurement. The MDSUM method could be used for mitigating the interference. However, the cross traffic could significantly prolong the process of finding an unbiased PPD, because the method will filter all samples, including the ones in FIG. 3 and FIG. 4, that do not meet a minimum delay sum condition. Moreover, delaying of the probe packets will have the same effect on the capacity measurement. As a result, a sufficient condition for obtaining an unbiased PPD for the PPD method is that both probe packets and both response packets belonging to the same packet pair are not delayed at all hops on the path. The time for obtaining such sample increases exponentially with the network traffic loading on the path.

The Minimum Delay Difference Method

Unlike the PPD method that admits a packet pair as the basic unit for capacity measurement, the minimum delay difference (MDDIF) method admits a packet as a basic unit. The MDDIF method obtains minimal possible delay of the first probe packet and minimal possible delay of the second probe packet, but these two packets do not necessarily belong to the same packet pair. By exploiting useful information in a single packet (which is discarded by the MDSUM method), the MDDIF method requires less time to obtain accurate capacity estimates, and has very low computation and storage costs.

In the present invention, the term "minDelay" is used to mean the minimal possible packet delay, which is defined as the delay experienced by a probe packet in a packet pair for which both the probe packet and the elicited response packet do not encounter any cross-traffic-induced queueing delay on the path, including (1) the queueing delay caused by the cross traffic present at the head of the queue upon the first probe/response packet's arrival and (2) the queueing delay caused by the intervening cross traffic between the first and second probe/response packets in a packet pair.

The first probe packet's minDelay can be obtained if and only if the probe packet and the elicited response packet are not queued behind the first-type cross traffic at all hops of the path. The second probe packet's minDelay can be obtained if and only if the probe packet and the elicited response packet are not queued due to the queueing delay experienced by the first probe/response packet in the same packet pair and the second-type cross traffic at all hops of the path. If $d_{2k-1}^{(n)}$ is the minDelay of the first probe packet in a $k^{th}$ packet pair and $d_{2l}^{(n)}$ is the minDelay of the second probe packet in an $l^{th}$ packet pair, where k is generally different from l, then $$X^{(h_f)} = d_{2l}^{(n)} - d_{2k-1}^{(n)} \text{ and } C_f^{(n)} = S_f / X^{(h_f)} \text{ for } X^{(h_f)} > X^{(h_r)}. \quad \text{Equation 4a}$$

$$X^{(h_r)} = d_{2l}^{(n)} - d_{2k-1}^{(n)} \text{ and } C_r^{(n)} = S_r / X^{(h_r)} \text{ for } X^{(h_f)} < X^{(h_r)}. \quad \text{Equation 4b}$$

Figure 5:
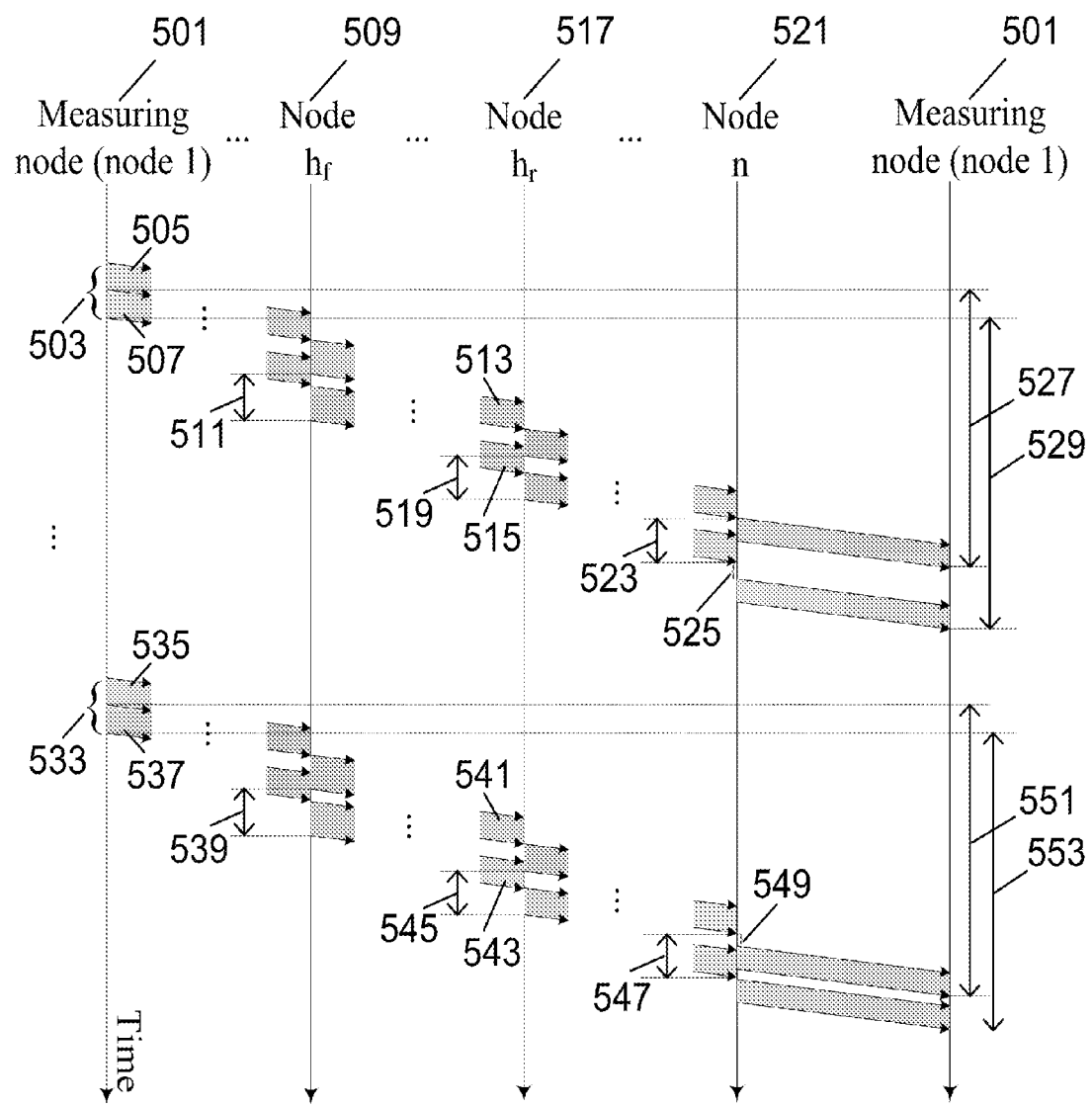
FIG. 5 is a time-line diagram illustrating an exemplary measurement session for the minimum delay difference (MDDIF) method to measure forward-path dispersion and forward-path capacity according to the present invention.

FIG. 5 is a time-line diagram illustrating an exemplary measurement session for the MDDIF method to measure forward-path dispersion and forward-path capacity. For this path, $X^{(h_f)} > X^{(h_r)}$. Therefore, according to Equation 2, a measuring node 501 measures the forward-path dispersion $X^{(h_f)}$ and the forward-path capacity according to Equation 4a by dispatching a sequence of sufficiently spaced out packet pairs.

A $k^{th}$ packet pair 503 consisting of a first probe packet $p_{2k-1}$ 505 and a second probe packet $p_{2k}$ 507 is dispatched. The two probe packets subsequently arrive at node $h_f$ 509 without experiencing any cross-traffic induced delay at the previous nodes and $h_f$, therefore leaving $h_f$ with a dispersion of $X^{(h_f)}$ 511. The two probe packets elicit response packets $r_{2k-1}$ 513 and $r_{2k}$ 515, respectively, and they arrive at node $h_r$ 517 without experiencing any cross-traffic induced delay at the previous nodes and $h_r$, therefore leaving $h_r$ with a (h) dispersion of $X^{(h_f)}$ 519. The two response packets subsequently arrive at node n 521 without experiencing any cross-traffic induced delay at the previous nodes, thus arriving with a dispersion of $X^{(h_f)}$ 523. The first response packet $r_{2k-1}$ is forwarded to the measuring node 501 without any queueing delay, but the second response packet $r_{2k}$ is delayed by some cross traffic 525 before being forwarded to 501. The measuring node 501 measures the first probe packet's RTT $d_{2k-1}^{(n)}$ 527 and the second probe packet's RTT $d_{2k}^{(n)}$ 529 where $d_{2k-1}^{(n)}$ is a minDelay but $d_{2k}^{(n)}$ is not.

An $l^{th}$ packet pair 533 consisting of a first probe packet $p_{2l-1}$ 535 and a second probe packet $p_{2l}$ 537 is dispatched later on. The two probe packets subsequently arrive at node $h_f$ 509 without experiencing any cross-traffic induced delay at the previous nodes and $h_f$, therefore leaving $h_f$ with a dispersion of $X^{(h_f)}$ 539. The two probe packets elicit response packets $r_{2l-1}$ 541 and $r_{2l}$ 543, respectively, and they arrive at node $h_r$ 517 without experiencing any cross-traffic induced delay at the previous nodes and $h_r$, therefore leaving $h_r$ with a dispersion of $X^{(h_f)}$ 545. The two response packets subsequently arrive at node n 521 without experiencing any cross-traffic induced delay at the previous nodes, thus arriving with a dispersion of $X^{(h_f)}$ 547. The first response packet $r_{2l-1}$ is delayed by some cross traffic 549 before being forwarded to 501, but the second response packet $r_{2l}$ is forwarded to 501 without any queueing delay. The measuring node 501 measures the first probe packet's RTT $d_{2l-1}^{(n)}$ 551 and the second probe packet's RTT $d_{2l}^{(n)}$ 553 where $d_{2l}^{(n)}$ is a minDelay but $d_{2l-1}^{(n)}$ is not. Based on the $k^{th}$ and $l^{th}$ packet-pair measurement, the measuring node can obtain the forward-path dispersion and forward-path capacity from Equation 4a.

Figure 6:
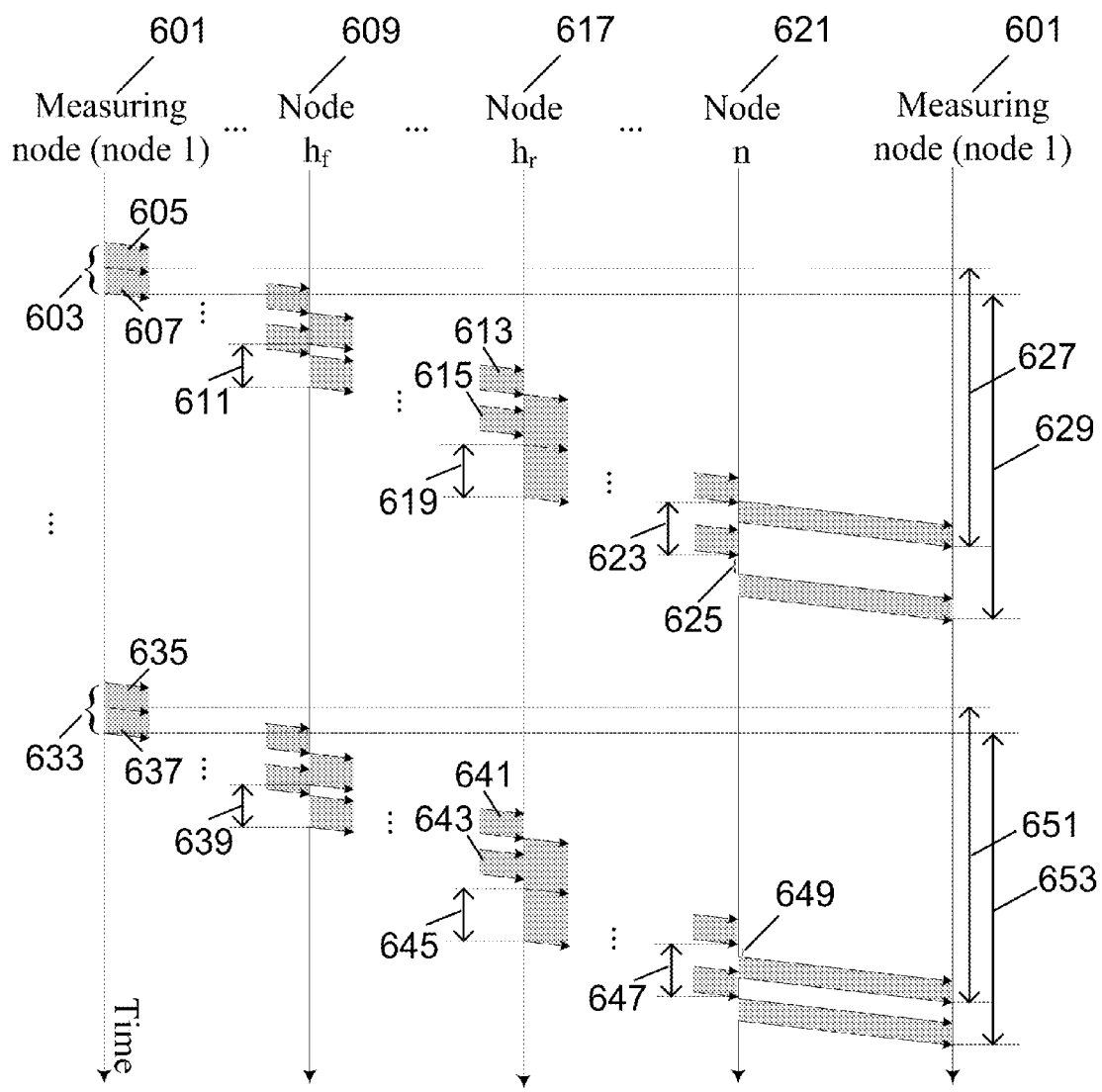
FIG. 6 is a time-line diagram illustrating an exemplary measurement session for the MDDIF method to measure reverse-path dispersion and reverse-path capacity according to the present invention.

FIG. 6 is a time-line diagram illustrating an exemplary measurement session for the MDDIF method to measure reverse-path dispersion and reverse-path capacity. For this path, $X^{(h_f)} < X^{(h_r)}$. Therefore, a measuring node 601 measures the reverse-path dispersion and the reverse-path capacity according to Equation 4b by dispatching a sequence of sufficiently spaced out packet pairs.

A $k^{th}$ packet pair 603 consisting of a first probe packet $p_{2k-1}$ 605 and a second probe packet $p_{2k}$ 607 is dispatched. The two probe packets subsequently arrive at node $h_f$ 609 without experiencing any cross-traffic induced delay at the previous nodes and $h_f$, therefore leaving $h_f$ with a dispersion of $X^{(h_f)}$ 611. The two probe packets elicit response packets $r_{2k-1}$ 613 and $r_{2k}$ 615, respectively, and they arrive at node $h_r$ 617 without experiencing any cross-traffic induced delay at the previous nodes and $h_r$, therefore leaving $h_r$ with a dispersion of $X^{(h_r)}$ 619. The two response packets subsequently arrive at node n 621 without experiencing any cross-traffic induced delay at the previous nodes, thus arriving with a dispersion of $X^{(h_r)}$ 623. The first response packet $r_{2k-1}$ is forwarded to the measuring node 601 without any queueing delay, but the second response packet $r_{2k}$ is delayed by some cross traffic 625 before being forwarded to 601. The measuring node 601 measures the first probe packet's RTT $d_{2k-1}^{(n)}$ 627 and the second probe packet's RTT $d_{2k}^{(n)}$ 629 where $d_{2k-1}^{(n)}$ is a minDelay but $d_{2k}^{(n)}$ is not.

An $l^{th}$ packet pair 633 consisting of a first probe packet $p_{2l-1}$ 635 and a second probe packet $p_{2l}$ 637 is dispatched later on. The two probe packets subsequently arrive at node $h_f$ 609 without experiencing any cross-traffic induced delay at the previous nodes and $h_f$, therefore leaving $h_f$ with a dispersion of $X^{(h_f)}$ 639. The two probe packets elicit response packets $r_{2l-1}$ 641 and $r_{2l}$ 643, respectively, and they arrive at node $h_r$ 617 without experiencing any cross-traffic induced delay at the previous nodes and $h_r$, therefore leaving $h_r$ with a dispersion of $X^{(h_r)}$ 645. The two response packets subsequently arrive at node n 621 without experiencing any cross-traffic induced delay at the previous nodes, thus arriving with a dispersion of $X^{(h_r)}$ 647. The first response packet $r_{2l-1}$ is delayed by some cross traffic 649 before being forwarded to 601, but the second response packet $r_{2l}$ is forwarded to 601 without any queueing delay. The measuring node measures the first probe packet's RTT $d_{2l-1}^{(n)}$ 651 and the second probe packet's RTT $d_{2l}^{(n)}$ 653 where $d_{2l}^{(n)}$ is a minDelay but $d_{2l-1}^{(n)}$ is not. Based on the $k^{th}$ and $l^{th}$ packet-pair measurement, the measuring node can obtain the reverse-path dispersion and reverse-path capacity from Equation 4b.

The MDDIF method is faster than the MDSUM method in obtaining accurate packet dispersion samples. Considering the forward-path dispersion scenarios in FIG. 3 and FIG. 5, the MDSUM method will throw away both packet-pair samples, but the MDDIF method will use both samples to obtain the forward-path dispersion and capacity. Similarly, for the reverse-path dispersion scenarios in FIG. 4 and FIG. 6, the MDDIF method will use both samples to obtain the reverse-path dispersion and capacity. In other words, the MDSUM method aims at finding a packet-pair sample in which the first probe packet's delay is a minDelay and the second probe packet's delay is a minDelay. On the other hand, the MDDIF method removes this restriction by obtaining the two minDelays from different packet pairs. Moreover, it will take the MDDIF method fewer packet pairs to obtain accurate capacity estimates than the MDSUM method.

An Analysis for Measurement Speed

The MDDIF and MDSUM methods can be compared based on a first-passage-time analysis. The MDDIF method's first passage time (FPT) is defined as the first time (in terms of the number of packet pairs sent) to obtain the two minDelays. On the other hand, the MDSUM method's FPT is defined as the first time to obtain the minimum delay sum (which is equal to the sum of the two minDelays). Therefore, a smaller FPT results in a faster measurement. Let $E[T_{SUM}]$ be the expected time for the MDSUM method to find an unbiased packet-pair dispersion for the capacity measurement, and $E[T_{DIF}]$ be the expected time for the MDDIF method to find an unbiased packet-pair dispersion for the capacity measurement. Further, let $$\Psi = \frac{E[T_{SUM}] - E[T_{DIF}]}{E[T_{SUM}]}. \qquad \text{Equation 5}$$

Therefore, $\Psi > 0$ means that the MDDIF method is faster than the MDSUM method.

The event of the first probe packet's RTT being a minDelay can be reasonably modeled as an independent, Bernoulli random variable. Similarly, the event of the second probe packet's RTT being a minDelay can be modeled as an independent, Bernoulli random variable, but the two random variables do not have to be independent. Under these assumptions, the expected time for the MDDIF method to find unbiased packet dispersion from different packet pairs for the capacity measurement is always no larger than the expected time for the MDSUM method to find unbiased packet dispersion from the same packet pair for the capacity measurement.

Figure 7:
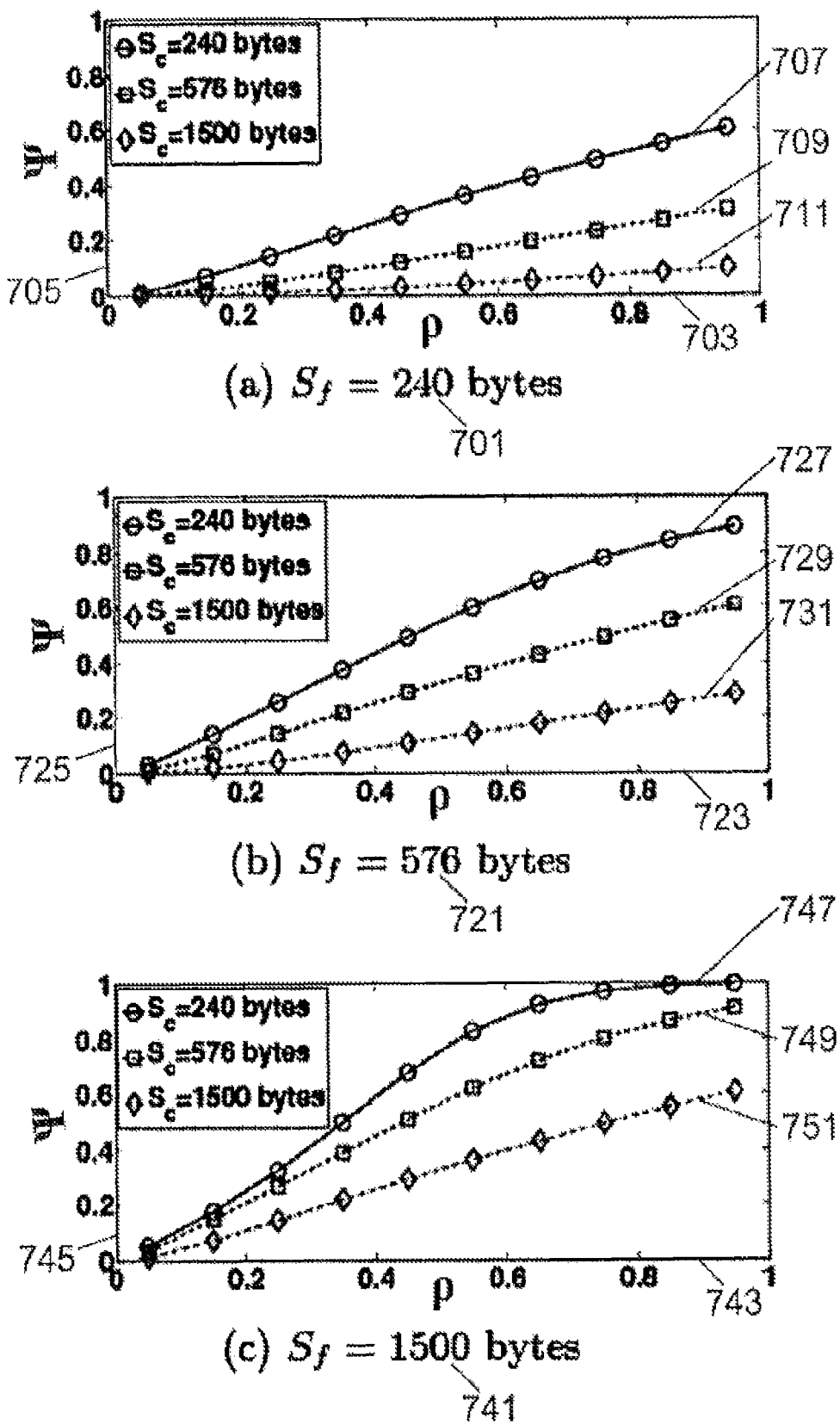
FIG. 7 is a set of graphs illustrating the analytical results for comparing the measurement speed of the MDDIF and MDSUM methods under various packet sizes and cross-traffic conditions.

FIG. 7 shows a comparison of the MDDIF and MDSUM methods based on their expected times of finding unbiased packet-pair dispersions for capacity measurement. There are five hops with respective link capacities of 100, 75, 55, 40, and 80 Mbits/s, and the $4^{th}$ hop on the reverse path is responsible for the packet-pair dispersion. The probe and response packet sizes are set to be the same. In the first set of results, the probe packet size $S_f$ is 240 bytes 701. The figure plots the mean utilization of each hop (ρ) 703 against Ψ 705 given in Equation 5. A higher ρ means that the path is more congested with network traffic. The plot shows that Ψ>0 for all three different mean packet size of the cross-traffic traffic: $S_c$=240 bytes 707, 576 bytes 709, and 1500 bytes 711. The MDDIF method's speed advantage increases with ρ and decreases with $S_c$.

In the second set of results, the probe packet size $S_f$ is 576 bytes 721. The figure plots the mean utilization of each hop (ρ) 723 against Ψ 725 given in Equation 5. The plot shows that Ψ>0 for $S_c$=240 bytes 727, 576 bytes 729, and 1500 bytes 731. The MDDIF method's speed advantage increases with ρ and decreases with $S_c$. Compared with the first set, the speed gain for 727 is higher than 707, the speed gain for 729 is higher than 709, and the speed gain for 731 is higher than 711.

In the third set of results, the probe packet size $S_f$ is 1500 bytes 741. The figure plots the mean utilization of each hop (ρ) 743 against Ψ 745 given in Equation 5. The plot shows that Ψ>1 for $S_c$=240 bytes 747, 576 bytes 749, and 1500 bytes 751. The MDDIF method's speed advantage increases with ρ and $S_c$. Compared with the second set, the speed gain for 747 is higher than 727, the speed gain for 749 is higher than 729, and the speed gain for 751 is higher than 731.

Exemplary Probe and Response Data Packets

Figure 8:
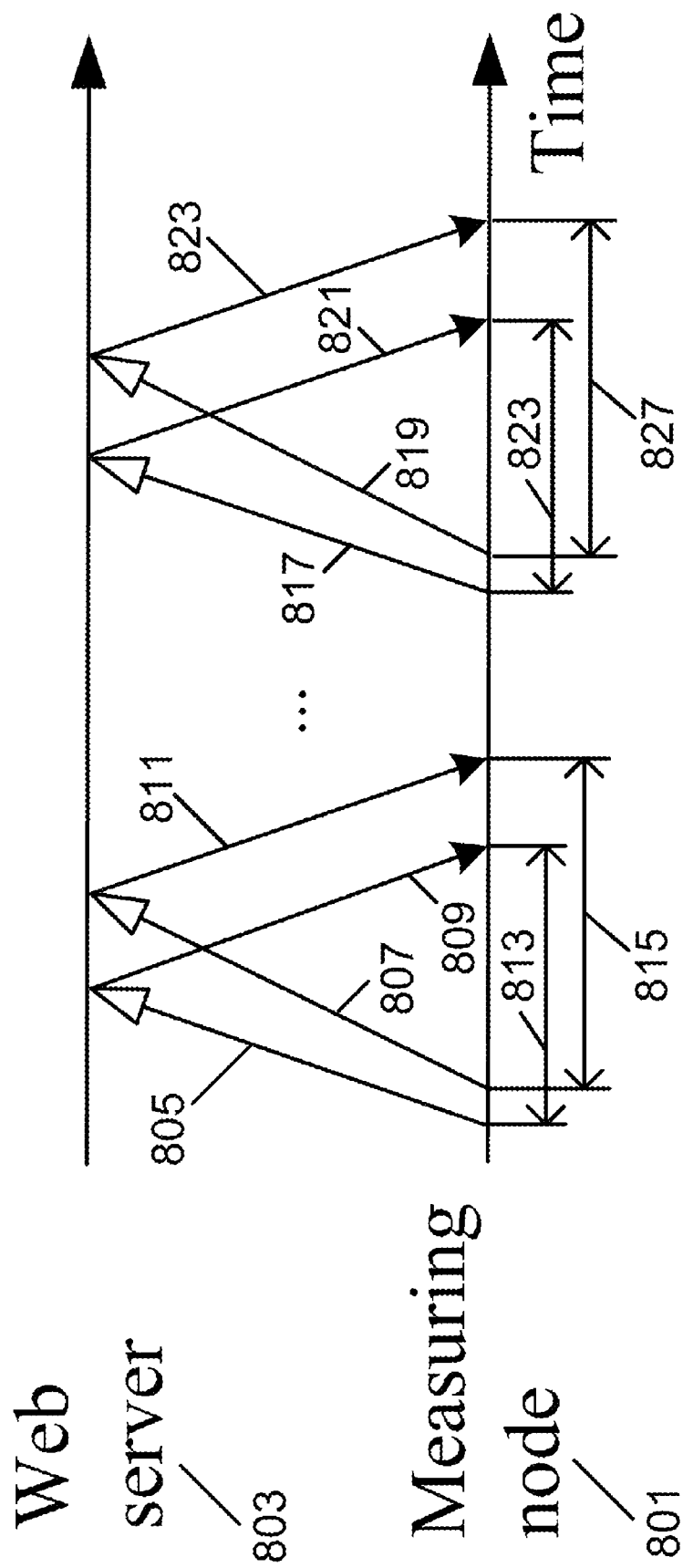
FIG. 8 is a time-line diagram illustrating the server's responses to receiving each probe HTTP/TCP data packet in a packet pair in a particular embodiment according to the present invention.

FIG. 8 shows that a measuring node 801 dispatches a sequence of sufficiently spaced packet pairs to a web server 803. A $k^{th}$ packet pair consisting of two back-to-back HTTP/TCP data packets $p_{2k-1}$ 805 and $p_{2k}$ 807 is sent to the web server 801 to measure the path capacity. The first probe packet $p_{2k-1}$ 805 elicits a response HTTP/data packet $r_{2k-1}$ 809 from the web server 803, whereas the second probe packet $p_{2k}$ 807 elicits a response HTTP/data packet $r_{2k}$ 811 from the web server 803. Upon receiving $r_{2k-1}$ 809, the measuring node 801 measures $d_{2k-1}^{(n)}$ 813 and updates the first probe packet's minDelay according to FIG. 2. Upon receiving $r_{2k}$ 811, the measuring node 803 measures $d_{2k}^{(n)}$ 815 and updates the second probe packet's minDelay according to FIG. 2.

An $l^{th}$ packet pair consisting of two back-to-back HTTP/TCP data packets $p_{2l-1}$ 817 and $p_{2l}$ 819 is sent to the web server 801 to measure the path capacity. The first probe packet $p_{2l-1}$ 817 elicits a response HTTP/data packet $r_{2l-1}$ 821 from the web server 803, whereas the second probe packet $p_{2l}$ 819 elicits a response HTTP/data packet $r_{2l}$ 823 from the web server 803. Upon receiving $r_{2l-1}$ 821, the measuring node 801 measures $d_{2l-1}^{(n)}$ 825 and updates the first probe packet's minDelay according to FIG. 2. Upon receiving $r_{2l}$ 823, the measuring node 803 measures $d_{2l}^{(n)}$ 827 and updates the second probe packet's minDelay according to FIG. 2.

Figure 9:
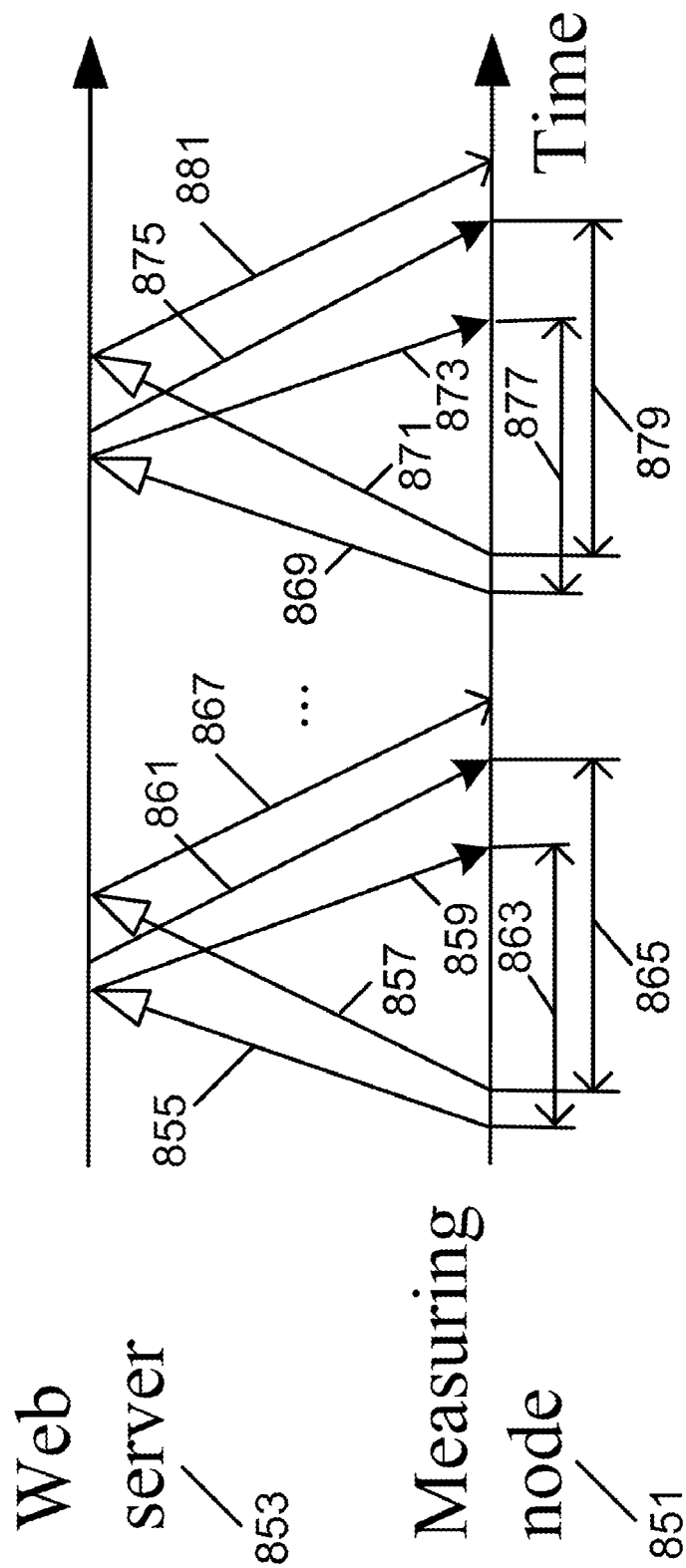
FIG. 9 is a time-line diagram illustrating the server's responses to receiving each out-of-ordered probe HTTP/TCP data packet in a packet pair in a particular embodiment according to the present invention.

FIG. 9 shows that a measuring node 851 dispatches a sequence of sufficiently spaced misordered packet pairs to a web server 853. For a $k^{th}$ packet pair consisting of two back-to-back HTTP/TCP data packets $p_{2k-1}$ 857 and $p_{2k}$ 855, $p_{2k}$ 855 is sent out before $p_{2k-1}$ 857 for reverse-path capacity measurement. The out-of-ordered $p_{2k}$ 855 elicits two response HTTP/data packet $r_{2k-1}$ 859 and $r_{2k}$ 861 at the same time from the web server 853. Upon receiving $r_{2k-1}$ 859, the measuring node 851 measures $d_{2k-1}^{(n)}$ 863 and updates the "first" probe packet's minDelay (which is the delay between sending the second probe packet and receiving the first response packet) according to FIG. 2. Upon receiving $r_{2k}$ 861, the measuring node 851 measures $d_{2k}^{(n)}$ 865 and updates the "second" probe packet's minDelay (which is the delay between sending the second probe packet and receiving the second response packet) according to FIG. 2. The late arrival of $p_{2k-1}$ 857 may elicit a pure TCP acknowledgment packet which could be safely ignored without affecting the reverse-path capacity measurement.

For an $l^{th}$ packet pair consisting of two back-to-back HTTP/TCP data packets $p_{2l-1}$ 871 and $p_{2l}$ 869, $p_{2l}$ 869 is sent out before $p_{2l-1}$ 871 for reverse-path capacity measurement. The out-of-ordered $p_{2l}$ 869 elicits two response HTTP/data packet $r_{2l-1}$ 873 and $r_{2l}$ 875 at the same time from the web server 853. Upon receiving $r_{2l-1}$ 873, the measuring node 851 measures $d_{2l-1}^{(n)}$ 877 and updates the "first" probe packet's minDelay (which is the delay between sending the second probe packet and receiving the first response packet) according to FIG. 2. Upon receiving $r_{2l}$ 875, the measuring node 851 measures $d_{2l}^{(n)}$ 879 and updates the "second" probe packet's minDelay (which is the delay between sending the second probe packet and receiving the second response packet) according to FIG. 2. The late arrival of $p_{2l-1}$ 871 may elicit a pure TCP acknowledgment packet which could be safely ignored without affecting the reverse-path capacity measurement.

Table 1 shows, as an example, the structure of the probe and response HTTP/TCP packets (including the TCP header and TCP payload, and each row contains a 32-bit word). Other elements belonging to the lower layer of the protocol stack (such as, the IP header, and Ethernet header and trailer) are excluded, because they are not directly related to the exemplary embodiment.

TABLE 1

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                     Acknowledgment Number                     |
+-+-+-+-+-+-+-+-+-+-+-+-+-+-+-+-+-+-+-+-+-+-+-+-+-+-+-+-+-+-+-+-+
|  Data |Reserv-|C|E|U|A|P|R|S|F|                               |
| Offset|ed     |W|C|R|C|S|S|Y|I|          Window Size          |
|       |       |R|N|G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                           HTTP Data                           |
+-+-+-+-+-+-+-+-+-+-+-+-+-+-+-+-+-+-+-+-+-+-+-+-+-+-+-+-+-+-+-+-+
```

For the case of order-intact probes, the actual content of exemplary probe and response packets is illustrated in Tables 2-5.

Table 2 is the first probe packet (with a 240-byte TCP data payload):

TABLE 2

| Fields | Value (in decimal) |
| --- | --- |
| Source Port | 11949 |
| Destination Port | 80 |
| Sequence Number | 1649735825 |
| Acknowledgement Number | 418938821 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 8357 |
| HTTP Data | GET /test1.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=040941617921000000040000000040OneProbe0Measurement0OneProbe0Measurement0OneProbe0Measurem\r\n\r\n |

Table 3 is the second probe packet (with a 240-byte TCP data payload):

TABLE 3

| Fields | Value (in decimal) |
| --- | --- |
| Source Port | 11949 |
| Destination Port | 80 |
| Sequence Number | 1649736065 |
| Acknowledgement Number | 418939061 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 7876 |
| HTTP Data | GET /test2.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=040941617921000000040000000040OneProbe0Measurement0OneProbe0Measurement0OneProbe0Measurem\r\n\r\n |

Table 4 is the first response packet (with a 240-byte TCP data payload):

TABLE 4

| Fields | Value (in decimal) |
| --- | --- |
| Source Port | 80 |
| Destination Port | 11949 |
| Sequence Number | 418939061 |
| Acknowledgement Number | 1649736065 |
| Data Offset | 5 |
| Reserved | 0 |
| CWR | 0 |
| ECN | 0 |

TABLE 4-continued

| Fields | Value (in decimal) |
| --- | --- |
| URG | 0 |
| ACK | 1 |
| PSH | 1 |
| RST | 0 |
| SYN | 0 |
| FIN | 0 |
| Window Size | 49200 |
| Checksum | 46172 |
| HTTP Data | 0123456789012345678901234567890123456789012345678901234567890123456789012345678901234567890123456789012345678901234567890123456789012345678901234567890123456789012345678901234567890123456789012345678901234567890123456789 |

Table 5 is the second response packet (with a 240-byte TCP data payload):

TABLE 5

| Fields | Value (in decimal) |
| --- | --- |
| Source Port | 80 |
| Destination Port | 11949 |
| Sequence Number | 418939301 |
| Acknowledgement Number | 1649736305 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 59235 |
| HTTP Data | 0123456789012345678901234567890123456789012345678901234567890123456789012345678901234567890123456789012345678901234567890123456789012345678901234567890123456789012345678901234567890123456789012345678901234567890123456789 |

For the case of misordered probes, the actual content of exemplary probe and response packets is illustrated in Tables 6-9.

Table 6 is the first probe data packet (with a 240-byte TCP data payload):

TABLE 6

| Fields | Value (in decimal) |
| --- | --- |
| Source Port | 11949 |
| Destination Port | 80 |
| Sequence Number | 1649735825 |
| Acknowledgement Number | 418938821 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 8357 |
| HTTP Data | GET /test1.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/? |

TABLE 6-continued

| Fields | Value (in decimal) |
|---|---|
| s=040941617921000000040000000040OneProbe0Measurement0OneProbe0Measurement0OneProbe0Measurem\r\n\r\n | |

Table 7 is the second probe data packet (with a 240-byte TCP data payload):

TABLE 7

| Fields | Value (in decimal) |
|---|---|
| Source Port | 11949 |
| Destination Port | 80 |
| Sequence Number | 1649736065 |
| Acknowledgement Number | 418939061 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 7876 |
| HTTP Data | GET /test2.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=040941617921000000040000000040OneProbe0Measurement0OneProbe0Measurement0OneProbe0Measurem\r\n\r\n |

Table 8 is the first response data packet (with a 240-byte TCP data payload):

TABLE 8

| Fields | Value (in decimal) |
|---|---|
| Source Port | 80 |
| Destination Port | 11949 |
| Sequence Number | 418939061 |
| Acknowledgement Number | 1649735825 |
| Data Offset | 5 |
| Reserved | 0 |
| CWR | 0 |
| ECN | 0 |
| URG | 0 |
| ACK | 1| |
| PSH | 1 |
| RST | 0 |
| SYN | 0 |
| FIN | 0 |
| Window Size | 49200 |
| Checksum | 9451 |
| HTTP Data | 01234567890123456789012345678901234567890123456789012345678901234567890123456789012345678901234567890123456789012345678901234567890123456789012345678901234567890123456789012345678901234567890123456789012345678901234567890123456789 |

Table 9 is the second response data packet (with a 240-byte TCP data payload):

TABLE 9

| Fields | Value (in decimal) |
|---|---|
| Source Port | 80 |
| Destination Port | 11949 |
| Sequence Number | 418939301 |

TABLE 9-continued

| Fields | Value (in decimal) |
| --- | --- |
| Acknowledgement Number | 1649735825 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 6472 |
| HTTP Data | 01234567890123456789012345678901234567890123456789012345678901234567890123456789012345678901234567890123456789012345678901234567890123456789012345678901234567890123456789012345678901234567890123456789 |

Testbed Evaluation

Figure 10:
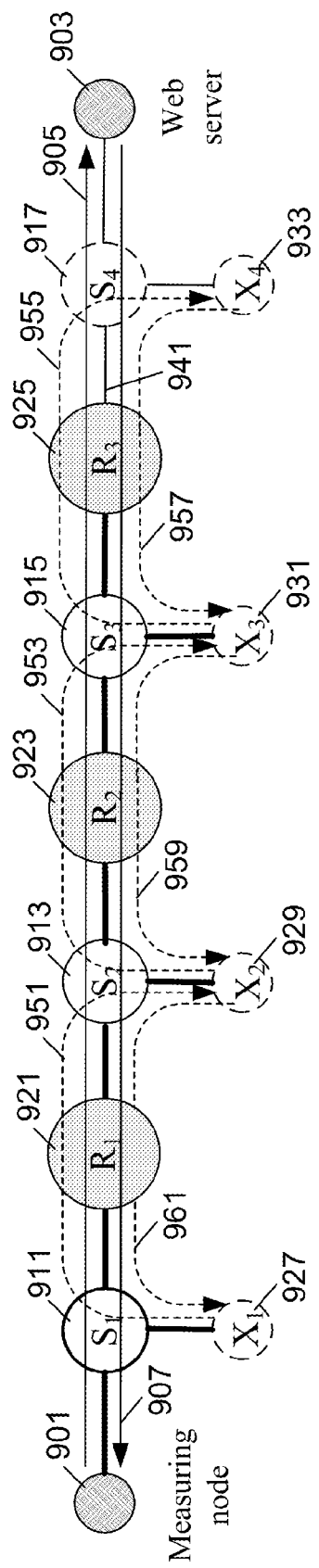
FIG. 10 is a block diagram illustrating the testbed used for evaluating and comparing the performance of the MDDIF and MDSUM methods.

FIG. 10 shows a 16-hop testbed for evaluating the MDDIF and MDSUM methods. A measuring node 901 dispatches a sequence of packet pairs to a web server Apache v2.2.3 903 on the forward path 905, and the two elicited response packets are sent back to 901 on the reverse path 907. The network path consists of four Ethernet switches $S_1$ 911, $S_2$ 913, $S_3$ 915, and $S_4$ 917; three Linux 2.6.26 routers $R_1$ 921, $R_2$ 923, and $R_3$ 925; and four cross-traffic sources $X_1$ 927, $X_2$ 929, $X_3$ 931, and $X_4$ 933. $S_1$ 911 is a Gigabit switch, $S_4$ 917 is a 10 Mbits/s switch, and others are 100 Mbits/s switches. The probe and response packet sizes are the same. Therefore, according to Equation 3c, the packet-pair dispersion will be given by the link 941 that is between $R_3$ 925 and $S_4$ 917, and the actual capacity is 10 Mbits/s.

The cross-traffic client $X_1$ 927 sends cross traffic 951 to $X_2$ 929 to emulate a loading rate of $\rho$ on the path from $S_1$ 911 to $S_2$ 913. The cross-traffic client $X_2$ 929 sends cross traffic 953 to $X_3$ 931 to emulate a loading rate of $\rho$ on the path from $S_2$ 913 to $S_3$ 915. The cross-traffic client $X_3$ 931 sends cross traffic 955 to $X_4$ 933 to emulate a loading rate of $\rho$ on the path from $S_3$ 915 to $S_4$ 917. The cross-traffic client $X_4$ 933 sends cross traffic 957 to $X_3$ 931 to emulate a loading rate of $\rho$ on the path from $S_4$ 917 to $S_3$ 915. The cross-traffic client $X_3$ 931 sends cross traffic 959 to $X_2$ 929 to emulate a loading rate of $\rho$ on the path from $S_3$ 915 to $S_2$ 913. The cross-traffic client $X_2$ 929 sends cross traffic 961 to $X_1$ 927 to emulate a loading rate of $\rho$ on the path from $S_2$ 913 to $S_1$ 911. TC/Netem is run at each router to emulate a fixed RTT of 300 milliseconds between 901 and 905.

Three sets of experiments were conducted for different cross-traffic loadings using the MDDIF and MDSUM methods with $S_f=S_r=240$ bytes. For each experiment, a sequence of L packet pairs was dispatched from the measuring node 901 to the web server 903. The measuring node 901 was equipped with a DAG 4.5 passive network monitoring card to obtain the packet-pair dispersion of each packet pair and each probe packet's RTT in microsecond resolution. For each set, the experiments were conducted for different values of L, ranging from 1 to 120. Moreover, for each L value, the experiments were conducted 50 times to obtain the mean and confidence intervals for the estimated path capacity $\hat{C}_b^{(n)}$ and $\Psi$. When $T_{SUM}$ was undefined after sending L packet pairs, $T_{SUM}=L$ and $\hat{C}_b^{(n)}$ was computed using the PPD of the packet pair with the smallest delay sum.

Figure 11:
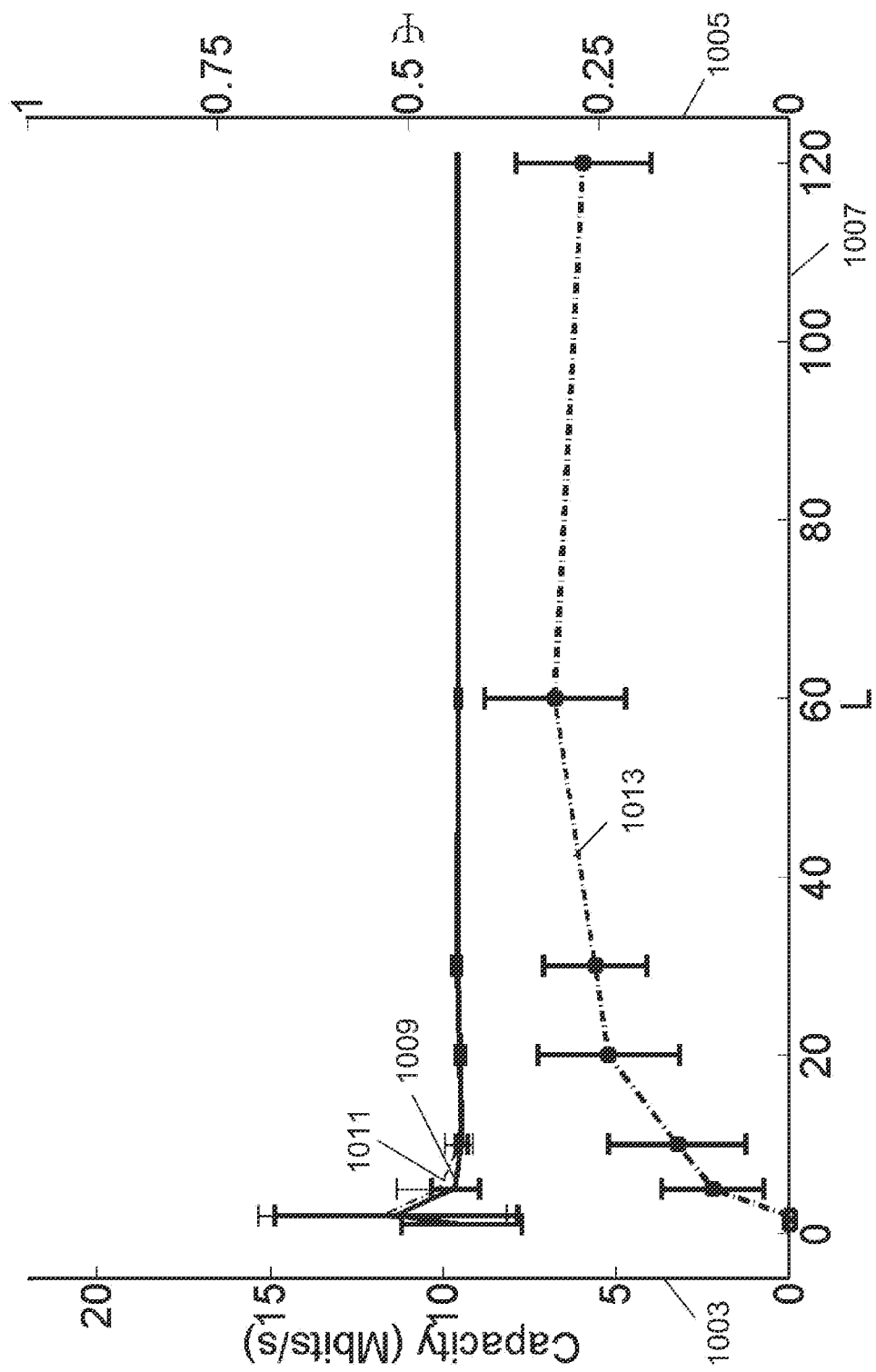
FIG. 11 is a graph illustrating the testbed results for comparing the measurement speed and accuracy of the MDDIF and MDSUM methods under various packet sizes, numbers of packet-pairs used for measurement, and low cross-traffic intensity.

FIG. 11 shows the first set of testbed results for evaluating the MDDIF and MDSUM methods in which the cross-traffic intensity is low ($\rho=0.1$ for all path segments). The figure plots the measured capacity 1003 and $\Psi$ 1005 against L 1007. The measured capacity obtained by the MDDIF method 1009 and the measured capacity obtained by the MDSUM method 1011 overlap for $L \geq 10$, and both are very accurate. However, the MDDIF method has a clear speed advantage with $\Psi \approx 25\%$ 1013.

Figure 12:
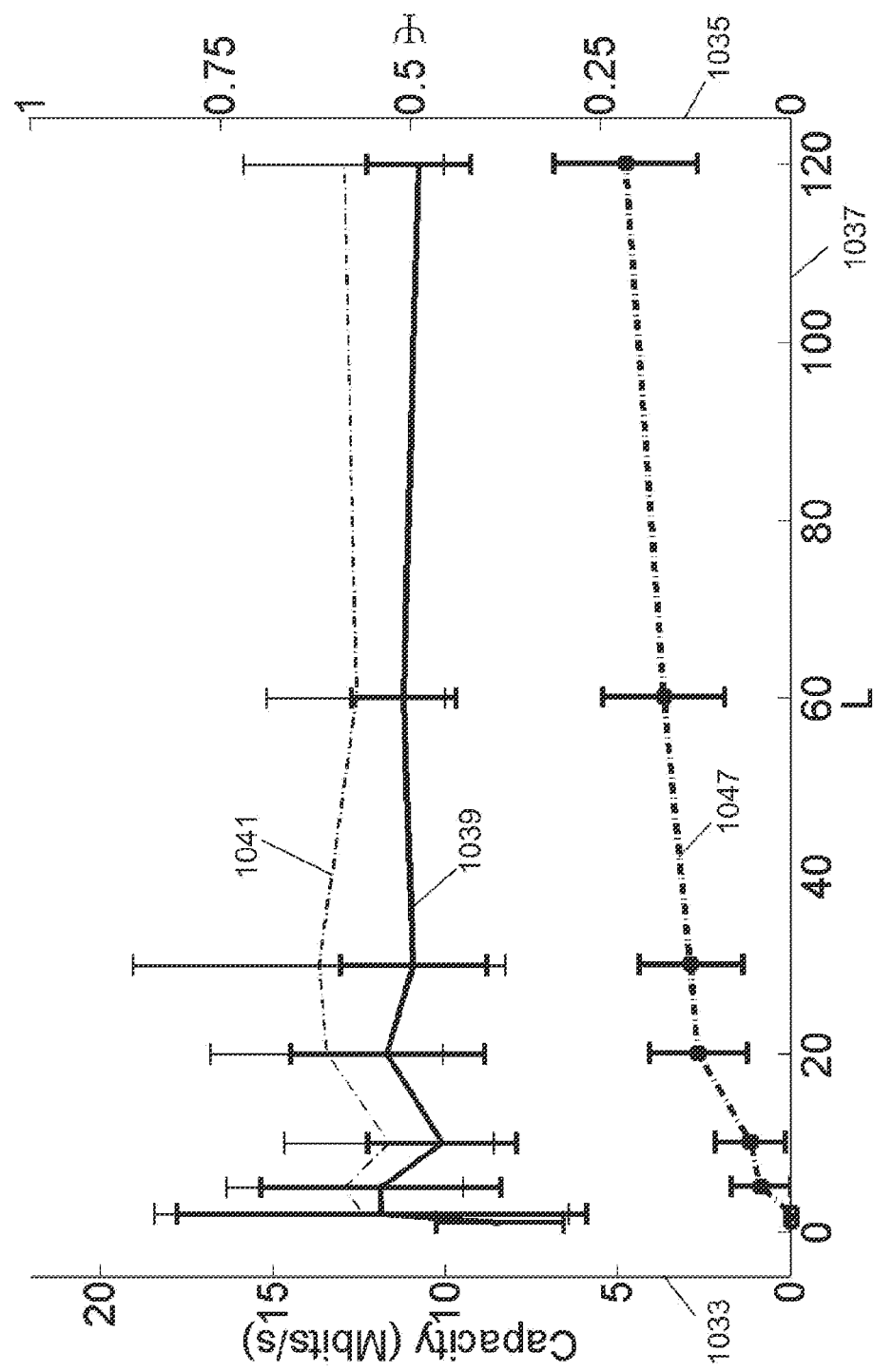
FIG. 12 is a graph illustrating the testbed results for comparing the measurement speed and accuracy of the MDDIF and MDSUM methods under various packet sizes, numbers of packet-pairs used for measurement, and high cross-traffic intensity.

FIG. 12 shows the second set of testbed results for evaluating the MDDIF and MDSUM methods in which the cross-traffic intensity is high ($\rho=0.5$ for all path segments). The figure plots the measured capacity 1033 and $\Psi$ 1035 against L 1037. It is showed that the capacity measurement is less accurate than the first set for both methods. However, the MDDIF method's measurement 1039 is more accurate than the MDSUM method 1041. For L=120, the MDDIF method obtained 10.78 Mbits/s 1043, whereas the MDSUM method 12.94 Mbits/s 1045. Similar to the first set, the MDDIF method is faster than the MDSUM method by about 25% 1047.

Figure 13:
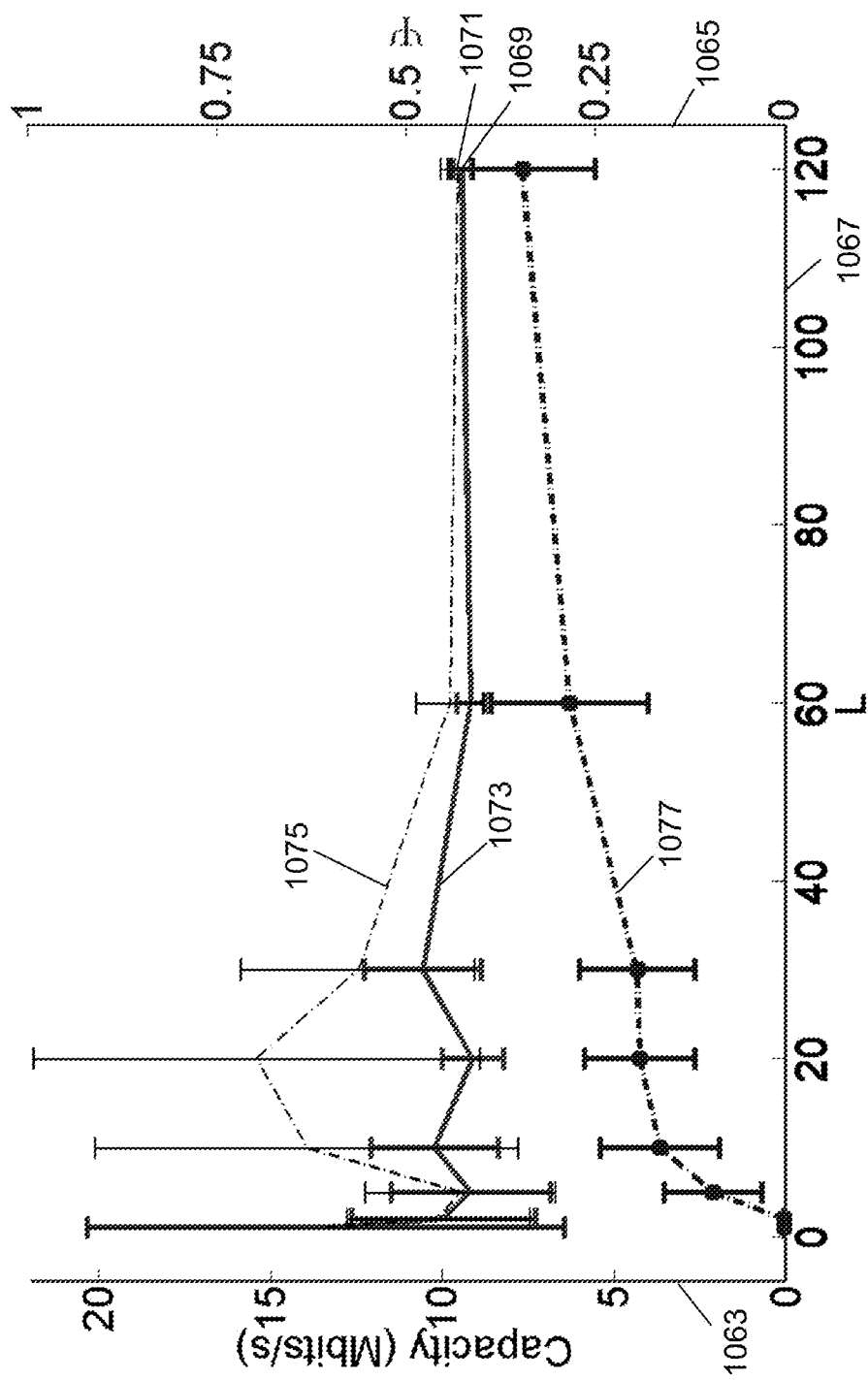
FIG. 13 is a graph illustrating the testbed results for comparing the measurement speed and accuracy of the MDDIF and MDSUM methods under various packet sizes, numbers of packet-pairs used for measurement, and a typical high-load downlink condition.

FIG. 13 shows the third set of testbed results for evaluating the MDDIF and MDSUM methods in which a typical high-load downlink condition was emulated by deploying asymmetric cross-traffic loads of $\rho=0.5$ for $X_3 \rightarrow X_2$ and $X_2 \rightarrow X_1$, and $\rho=0.1$ for others. The figure plots the measured capacity 1063 and $\Psi$ 1065 against L 1067. It is shown that both methods are sufficiently accurate for L=120. The MDDIF method obtained 9.42 Mbits/s 1069 and the MDSUM method obtained 9.56 Mbits/s 1071. However, the measured capacity obtained by the MDSUM method 1075 sees a higher variation than the measured capacity obtained by the MDDIF method 1073 when L is not large enough. Similar to the last two sets, the MDDIF method is faster than the MDSUM method by more than 25% 1077.

Exemplary Computing Environment

The method for the present invention is operational with numerous other general-purpose or special-purpose computing system environments or configurations. Examples of well known computing systems, environments, and/or configurations that may be suitable for practicing the present invention include, but are not limited to, personal computers, server computers, thin clients, thick clients, hand-held or laptop devices, multiprocessor systems, microprocessor-based systems, set top boxes, programmable consumer electronics, wireless phone, wireless communication devices, network PCs, minicomputers, mainframe computers, distributed computing environments that include any of the above systems or devices, and the like.

The measuring node according to the present invention may be described in the general context of computer-executable instructions, such as program modules, being executed by a computer. Generally, program modules include routines, programs, objects, components, data structures, etc. that perform particular tasks or implement particular abstract data types. The measuring node according to the present invention may also be practiced in distributed computing environments where tasks are performed by remote processing devices that are linked through a communications network. In a distributed computing environment, program modules may be located in both local and remote computer storage media including memory storage devices.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A method of measuring a digital communication network path capacity, comprising the steps of:
   transmitting a plurality of probes with a time gap between adjacent probes from a local endpoint node to a remote endpoint node, where each of said probes have a same load on a network path comprising one or more hops, and each of said probes comprises at least two back-to-back outgoing packets and is configured to cause said remote endpoint node to send at least two response packets back to said local endpoint node;
   selecting, for each of said probes, a pair of adjacent response packets from said at least two response packets as a first response packet and a second response packet, respectively;
   measuring, for each of said probes, a first round-trip time between the time sending said probe from said local endpoint node and the time receiving said first response packet at said local endpoint node and a second round-trip time between the time sending said probe from said local endpoint node and the time receiving said second response packet at said local endpoint node;
   determining from said local endpoint node a minimum first round-trip time which is the minimum of all said first round-trip times and minimum second round-trip time which is the minimum of all said second round-trip times;
   computing from said local end-point, by a processor, a minimum delay difference by subtracting said minimum first round-trip time from said minimum second round-trip time, where said minimum delay difference reflects network path capacity, wherein:
   each of said probes comprises a first outgoing packet and a second outgoing packet where said second outgoing packet causes said remote endpoint node to send at least two back-to-back response packets back to said local endpoint node; and
   for each of said probes, the first two response packets received by said local endpoint node are chosen as said first response packet and said second response packet.

2. The method of measuring digital communication network path capacity according to claim 1, wherein each of said probes is configured for measuring network's forward-path capacity.

3. The method of measuring digital communication network path capacity according to claim 1, wherein each of said probes is configured for measuring network's round-path capacity which is the minimum of the forward-path capacity and reverse path capacity.

4. The method of measuring digital communication network path capacity according to claim 1, wherein each of said probes is configured for measuring network's reverse path capacity.

5. The method of measuring digital communication network's reverse-path capacity according to claim 4, wherein:
   (a) packet sizes of said second outgoing packets from all said probes are the same as each other;
   (b) packet sizes of said at least two back-to-back response packets are the same as each other.

6. The method of measuring digital communication network path capacity according to claim 1, wherein said digital communication network is the Internet.

7. The method of measuring digital communication network path capacity according to claim 1, wherein said digital communication network comprises a plurality of nodes in addition to said local endpoint node and said remote endpoint node.

8. The method of measuring digital communication network path capacity according to claim 7, wherein said nodes are linked by wire, wireless, or mixed wire and wireless connections.

9. The method of measuring digital communication network path capacity according to claim 1, wherein said outgoing packets and response packets are Transmission Control Protocol (TCP) data packets.

10. The method of claim 1, wherein said time gap between adjacent probes is large enough so that all response packets from a probe have been received by said local endpoint node before sending a next probe.

11. The method of claim 1, wherein said at least two back-to-back packets comprises a pair of data payload packets.

* * * * *

UNITED STATES PATENT AND TRADEMARK OFFICE
CERTIFICATE OF CORRECTION

PATENT NO. : 8,531,952 B2  
APPLICATION NO. : 12/626965  
DATED : September 10, 2013  
INVENTOR(S) : Edmond W. W. Chan et al.

Page 1 of 1

It is certified that error appears in the above-identified patent and that said Letters Patent is hereby corrected as shown below:

In the Claims:

Claim 1, Column 21, Line 33 – delete "on" and insert -- to --.

Claim 1, Column 21, Line 51 – delete "minimum" and insert -- a minimum --.

Claim 1, Column 21, Line 54 – delete "end-point" and insert -- endpoint --.

Claim 3, Column 22, Line 21 – delete "reverse path" and insert -- reverse-path --.

Claim 4, Column 22, Line 24 – delete "reverse path" and insert -- reverse-path --.

Claim 11, Column 22, Line 53 – delete "packets comprises" and insert -- response packets comprises --.

Signed and Sealed this  
Twenty-sixth Day of May, 2015

Michelle K. Lee  
*Director of the United States Patent and Trademark Office*